March 31, 1964

W. DETTINGER 3,126,706

HYDRAULICALLY OPERATED UNIT, PARTICULARLY
FOR ELEVATING PLATFORMS AND LIFTS

Filed Oct. 4, 1960

INVENTOR.
W. Dettinger
BY Lowry & Rinehart
ATTYS.

INVENTOR.
W. Dettinger

March 31, 1964 W. DETTINGER 3,126,706
HYDRAULICALLY OPERATED UNIT, PARTICULARLY
FOR ELEVATING PLATFORMS AND LIFTS
Filed Oct. 4, 1960 5 Sheets-Sheet 3

INVENTOR.
W. Dettinger
BY Lowry + Rinehart
ATTYS.

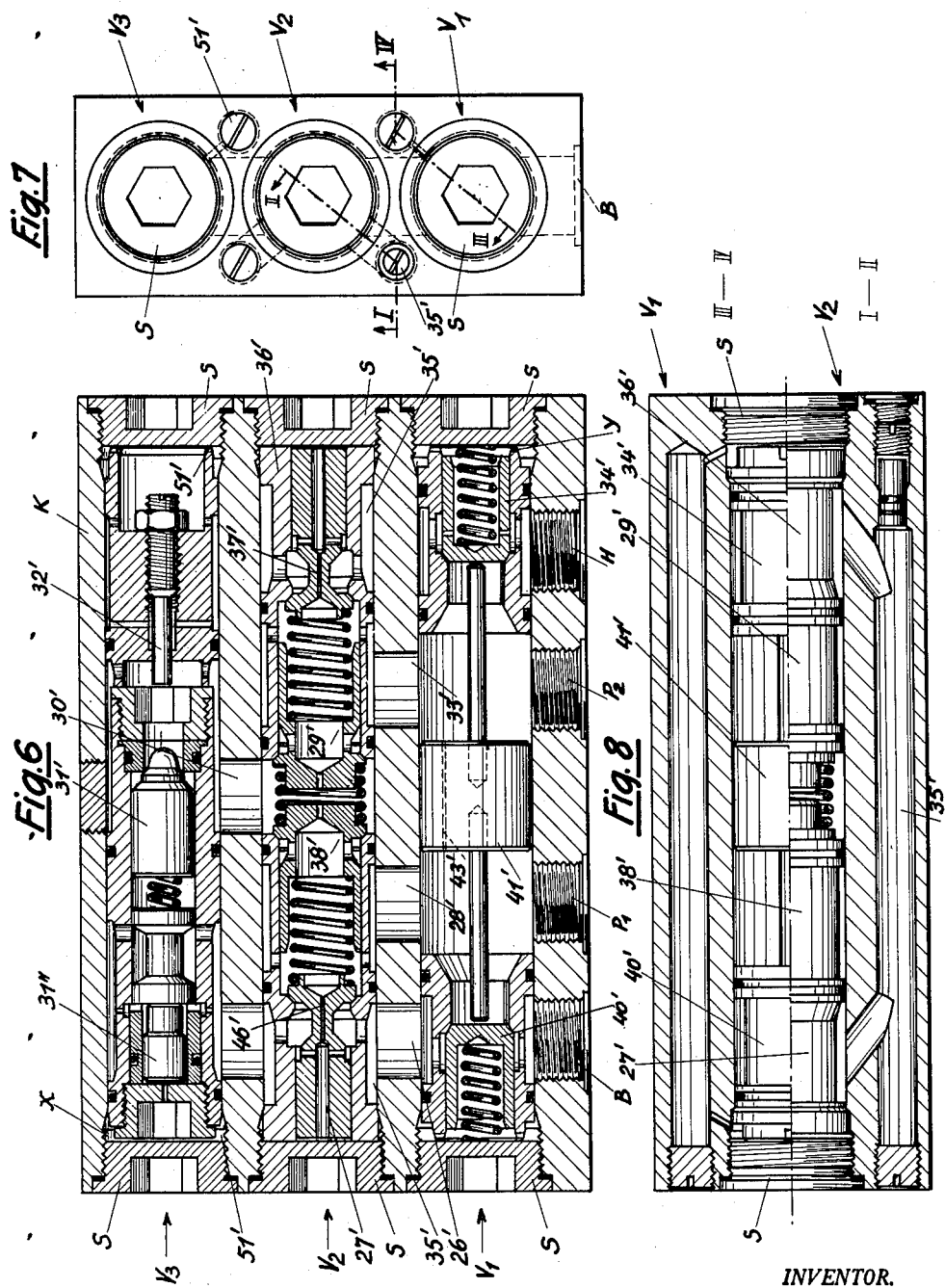

United States Patent Office 3,126,706
Patented Mar. 31, 1964

3,126,706
HYDRAULICALLY OPERATED UNIT, PARTICULARLY FOR ELEVATING PLATFORMS AND LIFTS
Willi Dettinger, Urach, Wurttemberg, Germany, assignor to Pumpenfabrik Urach, Urach, Wurttemberg, Germany, a firm
Filed Oct. 4, 1960, Ser. No. 60,508
Claims priority, application Germany Oct. 5, 1959
10 Claims. (Cl. 60—52)

The invention relates to hydraulic systems, and more specifically to a hydraulically operated unit for elevating platforms, lifts and the like which is composed of a pump and a preferably single-acting, continuously loaded upright operating cylinder.

It is known to control such units either by means of compressed air or only by means of solenoid valves, the latter type of control being employed preferably in hydraulic lifts which must allow an accurate control as to the level where they are intended to be arrested.

The compressed-air operated control systems which are used for elevating platforms used primarily in motor car service, require intermediate pressure fluid tanks which are likewise equipped with solenoid valves or similar valves. This means that both in units for hydraulically operated lifts and in units for elevating platforms control systems of relatively complex structure are required, a fact which materially adds, of course, to increased costs of the whole unit.

It is further known in hydraulically operated units to effect the elevating movement by actuating a drive motor for the pump, whereas the descending movement is effected by the actuation of a separate manually controllable valve with the motor switched off, that is, to say, two different and separate actuating means are used. Such units must be attended to by a skilled mechanic.

Finally, it is known in hydraulically operated units to effect the elevating and the descending movements by means of a pump with reversible feed directions. No device, however, is provided for retarding the motor so that the unit does not permit to be arrested in, for example, intermediate positions. When the drive motor is switched off, the continuously effective load such as the weight of the plunger and the elevating platform and the like causes the pump to rotate and the motor, in turn, to be driven by the pump.

It is the object of the present invention to overcome the aforementioned drawbacks and to provide a hydraulically operated unit, the control of which is not only of simple construction and reliable in operation but also enables a more favorable and space-saving set-up of the unit with respect to the known arrangements.

This object is attained by the provision of a hydraulically operated unit for elevating platforms, lifts and the like, which comprises an upright continuously loaded operating or lifting cylinder and a plunger piston movable therein, a pump arranged between said lifting cylinder and a fluid reservoir and driven by a motor so as to allow reversal of the feeding direction of said pump, servo-controllable non-return valves connected in conduits leading to either side of said pump, said servo-controllable non-return valves being adapted to be loaded by said lifting cylinder and closable in the direction of said pump, and plain non-return valves connected in conduits extending parallel thereto from said fluid reservoir, said plain non-return valves being adapted to open in the direction of said pump.

This construction allows the pump to be separated from the operating cylinder whereby the piston or plunger can be hydraulically arrested in any desired position.

According to a further feature of the invention, a first control conduit extends from the operating or lifting cylinder to a first controllable non-return valve which is connected in a conduit leading from the pump to the reservoir, whereas a second control conduit branching off between the pump and said first valve extends to a second controllable non-return valve, in such a manner that the pressure in the lifting cylinder servo-controls the first controllable non-return valve and, vice versa, the pressure built up by said first controllable non-return valve servo-controls the second controllable non-return valve.

By this arrangement, it is attained substantially by means of plain non-return valves that all control operations which are necessary for lifting and lowering the platform take place in the conduits and depend merely upon the respective feeding direction to which the pump is reversed. The control system, therefore, allows a simple and inexpensive set-up. The operative reliability of non-return valves is practically unlimited and, what is more, the non-return valves need not be serviced.

According to another feature of the invention, the pump, the electric motor to drive it and the non-return valves can be incorporated in the piston or plunger of the lifting cylinder, which plunger serves at the same time as fluid reservoir. This arrangement results in a compact structure and the least possible susceptibility to trouble and, besides, requires only few installations.

In another form of construction, pump, motor, and non-return valves can be arranged exteriorly of the lifting cylinder, the valves and the connecting conduits being housed in a common casing and connected to the lifting cylinder via a single connecting conduit.

Several preferred embodiments of the invention will now be described by way of example and with reference to the accompanying drawings, in which:

FIG. 6 is a vertical section, on an enlarged scale, through the system of valves and conduits arranged in a common casing exteriorly of the lifting cylinder;

FIG. 7 is an end view of FIG. 6;

FIG. 8 is a section taken, with respect to the upper half, on the line I—II in FIG. 7 and, with respect to the lower half, a section taken on the line III—IV in FIG. 7.

Figure 1:
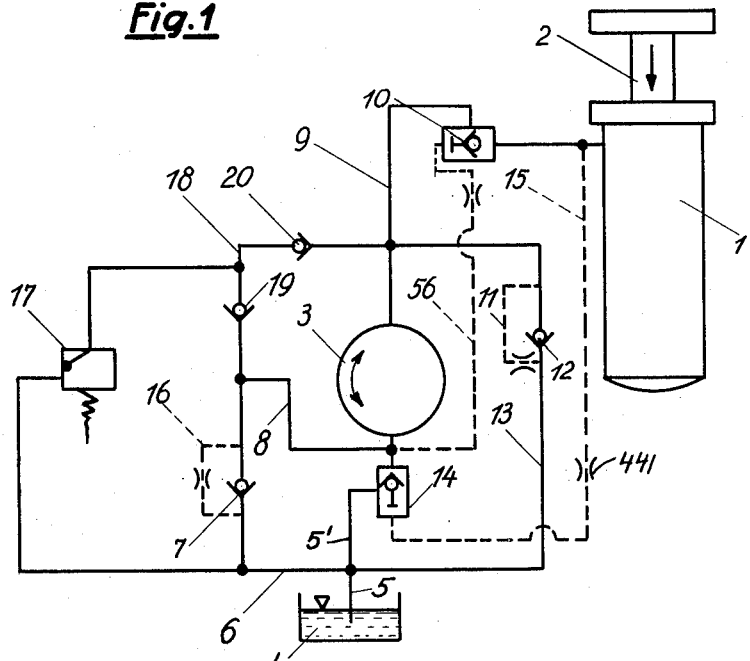
FIG. 1 is a diagrammatic view of the novel hydraulic unit, particularly for use with elevating platforms.

With reference now to FIG. 1, in the system for a hydraulic elevating platform a single-acting operating cylinder 1 is provided having a plunger piston 2 movable in the cylinder 1 and carrying a platform or the like not shown. The plunger piston 2 is operated by a pump 3 which is driven by a reversible electric motor and, consequently, capable of feeding fluid in either direction.

For the control of this system a plurality of non-return valves are provided which will be described hereinafter in connection with the operation of the unit.

In elevating the platform, the pump operates in a direction, in which oil is drawn in from a reservoir 4 through a conduit 5, a conduit 6, a non-return valve 7 and through a conduit 8. The pump forces the oil through a conduit 9 and a non-return valve 10 into the operating cylinder 1 and thus elevates the plunger piston 2.

When the drive motor of the pump is switched off at any desired moment, the plunger piston 2 will stop at once at the level once reached. After a while the system of conduits will be relieved of pressure through the intermediary of an equalizing or overflow-oil conduit 11 which bridges a non-return valve 12 of a conduit 13 which extends from the conduit 9 to the conduit 5.

When the platform is to descend again, the drive motor of the pump is switched on to rotate in opposite direction. The pump will now draw in oil through the conduit 5 and the conduit 13 and force it into circulation through a controllable non-return valve 14. This non-return valve 14 is servo- or pre-controlled via a control conduit 15 connected to the feed conduit leading to the cylinder 1, in such a manner that the opening pressure equals the pressure in the cylinder 1. Hence it follows that in the lines 8 and 56 the same pressure is established as in the operating cylinder 1. After the pressure in line 56 is sufficient to open the check valve 10, fluid is actually pumped from the cylinder 1 through valves 10 and 14 back to the reservoir 4. When the motor is switched off, the plunger piston 2 will stop at once.

When the platform has descended and the motor of the pump has been switched off, the pressure in the conduit 8 is broken up by means of an overflow-oil conduit 16 bridging the non-return valve, whereas the pressure built up on the downstream side of the controllable valve 10, can be equalized via the overflow-oil conduit 11, immobilizing the plunger piston 2.

In order to protect the unit and the conduit system from overloads, a safety valve 17 of the type known per se is provided which is connected to the conduit 6 and a conduit 18. The direction of response of this valve is controlled by two non-return valves 19 and 20 which are so connected in the conduit 18 as to act in opposed directions.

This arrangement results in a very reliable operation of the unit causing the plunger piston to be hydraulically arrested whenever the drive motor is brought to a stop.

Figure 2:
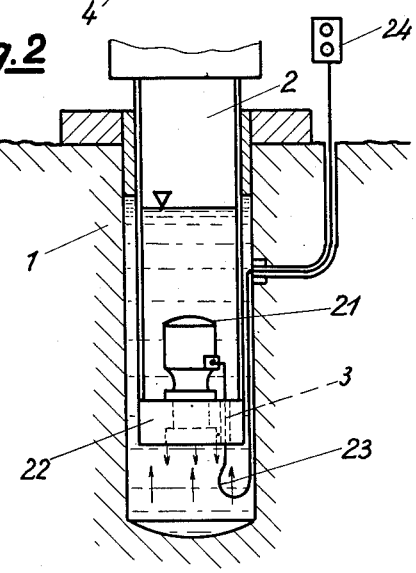
FIG. 2 is a view of a first embodiment of the invention with the electrically driven pump incorporated in the plunger piston.
Figure 3:
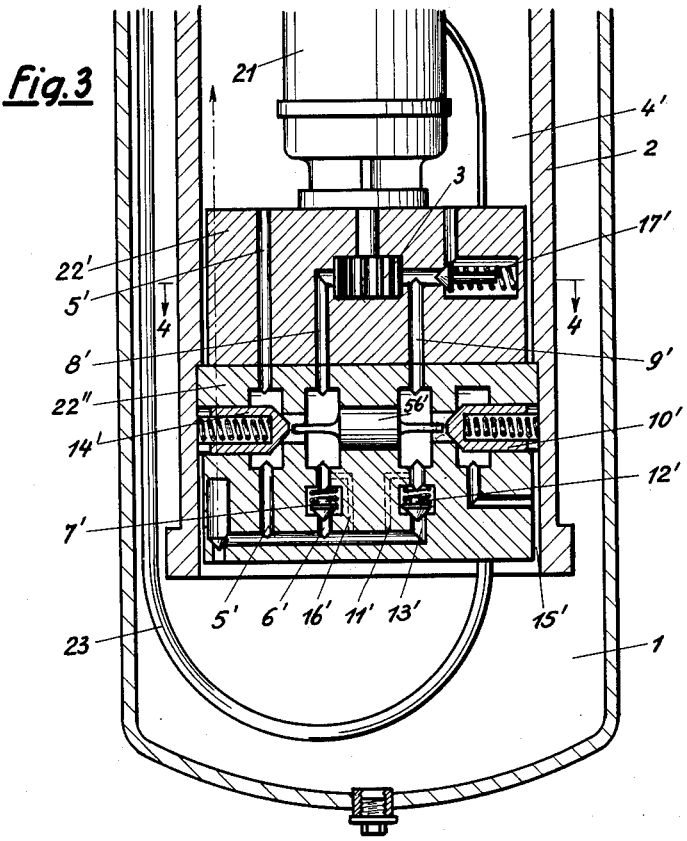
FIG. 3 is a vertical axial section, on an enlarged scale, through the arrangement of conduits and valves according to FIG. 2.
Figure 4:
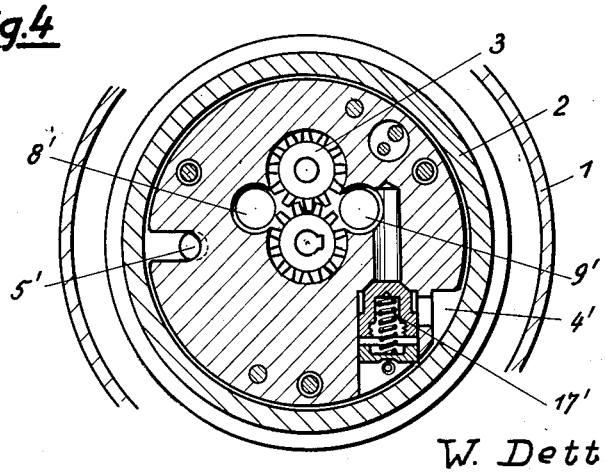
FIG. 4 is a cross-section taken on the line 4—4 in FIG. 3, with the valve turned through an angle of 90°.

In order to further simplify the structure, an electric drive motor 21 can be directly built into the movable plunger piston 2, the motor in this case having to be a motor adapted to run in oil, as is shown in FIGS. 2 and 3. The plunger piston 2 is provided with a hollow space 4' in which the motor 21 is accommodated. The motor 21 is mounted on a flange 22 at the lower end of the plunger piston. The pump 3 which is embodied in the form of a geared pump, and the control valves shown in FIG. 1 are incorporated in the flange 22 whereby no further installations are required. Current is supplied to the electric drive motor 21 via an oil-tight trailing cable 23 which is connected to a reversing switch 24. The hollow space 4' provided in the plunger piston 2 serves at the same time to receive a supply of oil which is under normal pressure so that the formation of foam as it may occur in the hitherto used intermediate oil tanks, is practically avoided.

In particular, the flange 22 consists according to FIG. 3 of a disc-like portion 22' containing the geared pump 3 and a likewise disc-like portion 22" in which the control valves are housed.

Apart from the pump, in the portion 22' there are housed a conduit 5' extending from the hollow space 4' of the plunger piston 2 to the valves, connecting conduits 8' and 9' of the pump and a safety valve 17' having branch conduits leading, on one hand, to the fluid supply contained in the hollow space 4' and, on the other hand, to the pump connection conduit 9'.

In the portion 22" two controllable non-return valves 10' and 14' are arranged symmetrically opposite each other whereas two plain non-return valves 7' and 12' having relief conduits 11' and 16' are arranged between them in juxtaposed relationship.

The arrangement of the valves 10' and 14' as shown in FIG. 3 permits a simple control thereof in that the control conduit 56 is replaced by a double-acting piston 56' which can act, by means of appropriate end extensions, on either of the valves for opening, the two end faces of the piston being acted upon by the same fluid pressure as the respective opposite valve.

The operation of the form of construction according to FIG. 3 is as follows: For elevating the platform, the pump 3 is so operated as to feed fluid from left to right with respect to the drawing. Fluid is drawn from the hollow space 4' of the plunger piston 2 through the conduit 5' past the valve 14' into a conduit 6' and further through the valve 7' which opens, past the left-hand end face of the double-acting control piston 56' into the conduit 8' and, finally, into the pump. On the right-hand side the pump forces the fluid into the conduit 9' to the upstream side of the valve 10'. This causes the valve 10' to open (to the right) and the fluid flows through a circumferential gap 15' into the cylinder 1, thereby forcing the plunger piston 2 upwardly. When the motor and, consequently, the pump are switched off, the system will be discharged via the discharge or relief conduit 11' between the conduits 9' and 5'.

For causing the platform to descend, the pump 3 is so operated as to feed fluid from right to left with respect to the drawing. Fluid is drawn via the conduits 5' and 6' and a conduit 13' through the valve 12' into the pump. The fluid is then forced through the conduit 8' to the upstream side of the valve 14', which opens, and thus caused to circulate. The valve 14' is acted upon, via the circumferential gap 15', by the pressure existent in the cylinder 1, said gap serving as an auxiliary control for closing the valve. Thereby the feed pressure on the upstream side of the valve 14' is caused to rise to the same level as the pressure in the cylinder. This pressure acts at the same time on the opposite end face of the control piston 56', forcing the latter to the right and thus causing the valve 10' to open so as to allow the fluid to return from the cylinder 1 through the circumferential gap 15' and the open valve 10' into the hollow space 4' of the plunger piston 2.

The safety valve 17' is provided in a conduit which leads directly from the conduit 9' to the hollow space 4' of the plunger piston.

Figure 5:
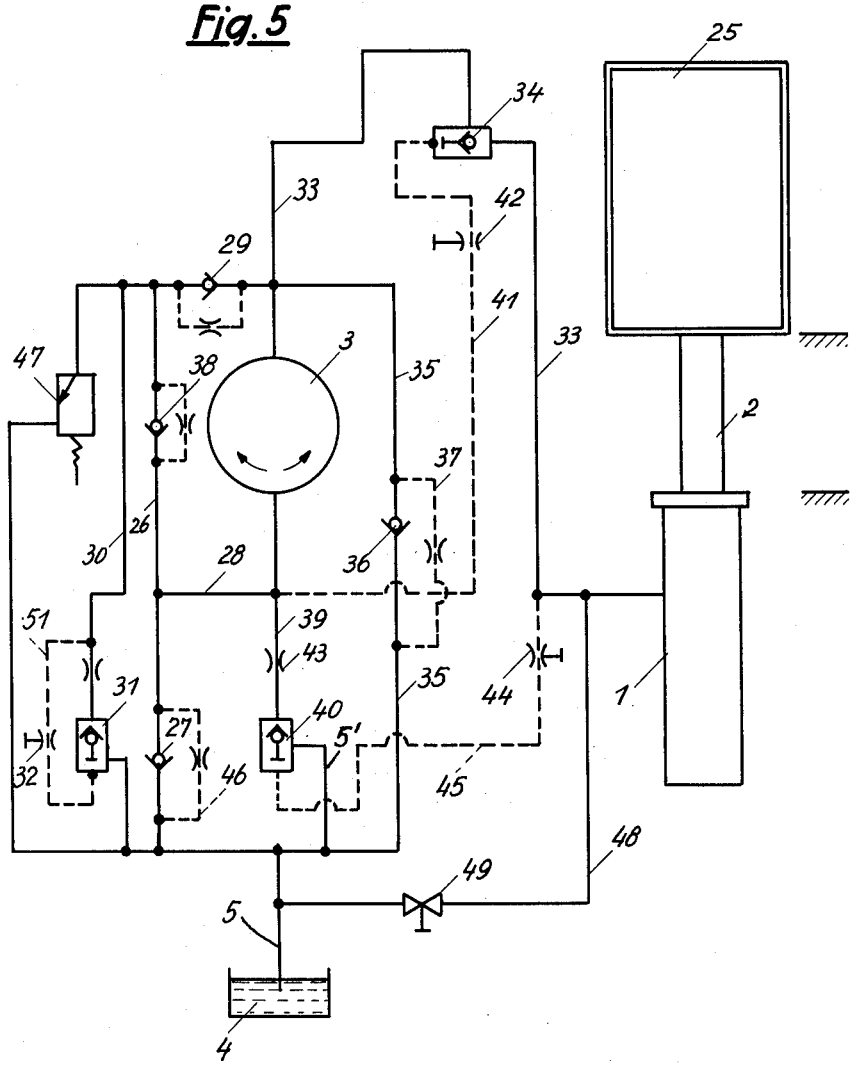
FIG. 5 is a diagrammatic view of a second embodiment, in particular for use with hydraulic lifts.

FIG. 5 shows a form of construction which is chiefly provided for hydraulic passenger lifts, but is also suitable for heavy loads, i.e. to put it concisely, for all cases where a jerking start is to be avoided.

In this case also, a reversible pump 3 is provided, whereas the plunger piston 2 movable in the cylinder 1 carries a lift cage 25.

For elevating the lift cage 25 the pump 3 is so operated as to draw oil from the reservoir 4 through the conduit 5, a non-return valve 27 connected to a conduit 26 and through a conduit 28 branching from said conduit 26. This oil is forced by the pump 3 into circulation via a non-return valve 29 and a preliminarily opened starting valve 31 connected to a further conduit 30. The starting valve 31 now gradually closes, the closing speed being adjustable by a throttle valve 32 in a control conduit 51. Thus, a pressure is built up in a conduit 33 which leads from the pump to the operating cylinder, said pressure causing the quantity of fluid which previously flowed off through the non-return valve 29, to be now fed to the operating cylinder 1 through a controllable non-return valve 34 connected to the conduit 33, thus enabling the passenger cage to start smoothly. When the starting valve is fully closed, the cage will travel at full speed which corresponds to the pump capacity. When the cage is to stop, all there is to be done is to switch off the drive motor. In order to relieve the system of pressure, a throttle conduit 37 of very small cross-section is connected parallel to a further non-return valve 36 arranged in a conduit 35 which leads from the conduit 33 to the conduit 5, this throttle conduit 37 enabling the pressure to be equalized.

The starting can be arbitrarily retarded by a corresponding adjustment of the throttle valve 32, i.e. by adjusting it to such an extent that the electric motor need not be started and accelerated when loaded and consequently allows to be operated with delta-Y connection without auxiliary equipment.

When the lift cage is to descend again, it is only necessary to operate the pump in an opposite sense of rotation, that is to say, the polarity of the drive motor has to be reversed by means of a suitable contactor.

The pump will now draw in oil through the conduits 5 and 35 and then force it into circulation via the conduit 28, the conduit 26 and a non-return valve 38 connected to said conduit 26 through the starting valve 31 which is open in this direction. The starting valve 31 now slowly closes in the same manner as before during the elevating operation, whereby pressure is built up in a conduit 39 on the upstream side of a closed non-return valve 40. This pressure causes the controllable non-return valve 34 which communicates via a control conduit 41 with the conduit 39, slowly to open. The opening speed can be arbitrarily regulated by means of an adjustable throttle valve 42 connected in the control conduit 41 so as to be brought into harmony with the closing speed of the starting valve 31.

According to this arrangement, the operating cylinder 1 is directly connected to the actual intake or suction side of the pump whereby in the conduit 33 a pressure is built up which corresponds to the weight of the lift cage 25. This pressure increased by a slight overpressure amounting to substantially three atmospheres and caused by a throttle valve 43 mounted on the upstream side of the non-return valve 40, prevails also in the conduit 39 so that the pump practically operates without pressure drop and only receives the idling performance.

In order to prevent rattling of the non-return valve 40 which serves as safety valve in starting, a further adjustable throttle valve 44 is provided, arranged in a control conduit 45 which connects the servo control of the valve 40 with the conduit 33 leading to the operating cylinder 1. For stopping the cage, it is only necessary to switch off the drive motor of the pump 3. Through a throttled equalizing conduit 46 connected in parallel to the non-return valve 27 as well as the above-mentioned throttle conduit 37, the system is relieved of pressure on the downstream side of the non-return valve 34.

To prevent overloads, especially in cases where the lifting movement is limited by mechanical means, there serves a safety valve 47 which may be connected parallel to the conduit 30.

From the description it appears that the connections and the arrangement of this novel unit will permit the lift to travel in any desired manner. Further, in the hydraulic part of the system all electrically operated elements hitherto used have been omitted which, as experience has shown, were more or less susceptible to trouble. If the controllable non-return valve 34 is incorporated directly in the operating cylinder 1, a crashdown of the lift cage due to rupture of a conduit is altogether impossible. In the case of power failure the lift cage will always come to a stop and be hydraulically arrested in this position. In order to bring the lift cage, moreover, into any desired position a drain conduit 48 is provided which can be opened by means of a hand-operated shut-off slide valve 49.

FIGS. 6, 7 and 8 show a practical embodiment, according to FIG. 5, of an arrangement of valves exterior of the lifting cylinder. A plurality of valves are housed in a common casing K and, in the present case, are divided among three parallel longitudinal bores $V_1$, $V_2$ and $V_3$ the ends of which are closed by screw plugs S.

The casing K has a bore B for connection to the fluid reservoir 4, two bores $P_1$ and $P_2$ for connection to either side of the pump 3, and a bore H for connection to the lifting cylinder. The reservoir 4, the pump 3 with the electric motor and the lifting cylinder have been omitted in FIGS. 6, 7 and 8.

The connecting bores B, $P_1$, $P_2$ and H merge into the longitudinal bore $V_1$ which includes controllable non-return valves 34′ and 40′ and the control conduit 41 acting, according to FIG. 5, on both valves, has been replaced by a double-acting control piston 41′, the respective end faces of which are acted upon by the same pressure as the opposite valve 34′ or 40′, respectively, whereby the control piston causes one or the other of these valves to open.

In the longitudinal bore $V_2$, non-return valves 27′ and 38′ opening in one direction are axially combined to one group, whereas valves 29′ and 36′ opening in the other direction are axially combined to a second group, both groups being acted upon in opposite senses by a common spring interposed between said groups. The longitudinal bore $V_3$ substantially includes a starting valve 31′.

The longitudinal bores $V_1$, $V_2$ and $V_3$ are interconnected by transverse bores which are marked in FIG. 7 by vertically extending dotted lines.

The afore-described control unit operates as follows: In elevating and with a corresponding feed direction, the pump draws fluid from the reservoir 4 (FIG. 5) through the connecting bore B into an annular channel surrounding the valve 40′ and thence, through a connecting conduit 26′ leading to the longitudinal bore $V_2$, into the valve 27′ which is caused to open, and further through this valve whence the fluid is fed back through a connecting conduit 28′ to the longitudinal bore $V_1$ and further through the connecting bore $P_1$ into the pump. On the other side, the pump forces the fluid through the connecting bore $P_2$ in transverse direction through the longitudinal bore $V_1$ and a connecting conduit 33′ into the longitudinal bore $V_2$ and to the upstream side of the valve 29′. Thereby the valve 29′ is caused to open and the fluid is forced through a connecting conduit 30′ into the longitudinal bore $V_3$ to the upstream side of the starting valve 31′, which opens, and flows via a connecting conduit not designated by a reference numeral into the longitudinal bore $V_2$ and further through the annular channel surrounding the valve 27′, the connecting conduit 26′ and through the valve 40′ to the connection B leading to the fluid reservoir 4. On the upstream side of the starting valve 31′, part of the fluid is at the same time branched off via an adjustable throttle valve 32′ to a conduit 51′ and through this conduit which extends parallel to the longitudinal bore $V_3$ from one end thereof to the other where it acts on an element 31″ which resiliently bears against the starting valve 31′. The cross-section of the element 31″ is larger than the cross-section of the bore controllable by the starting valve 31′ so that the starting valve closes gradually. When the starting valve 31′ is closed, the total quantity of fluid fed by the pump will be forced from the bore $P_2$ through the valve 34′ to the connecting bore H and from there, into the lifting cylinder 1.

The lift cage is caused to descend by reversing the fluid-feeding direction of the pump. The latter draws fluid from the reservoir through the connecting bore B, the annular channel surrounding the valve 40′, and the connecting conduit 26′ into the annular channel surrounding the valve 27′, which channel, together with a longitudinal channel extending parallel to the longitudinal bore $V_2$ and the annular channel surrounding the valve 36′, constitutes a conduit 35′. The valve 36′ is caused to open and the fluid flows through the connecting bore $P_2$ to the actual intake or suction side of the pump. The pump forces the fluid via the bore $P_1$ and across the longitudinal bore $V_1$ into the connecting conduit 28′, whence it flows through the valve 38′ which is caused to open, and through the connecting conduit 30′ to the upstream side of the starting valve 31′. The latter is caused to open. By branching off part of the fluid and causing same to act, via the element 31″, upon the starting valve 31′ in the same manner as in the elevating operation, the starting valve 31′ will gradually close. Thereby pressure is built up between the closed valve 40′ and the opposite end face of the control piston 41′, which pressure shifts said piston to the right in FIG. 6 and causes the controllable non-return valve 34′ slowly to open. Thus, the lifting cylinder 1 is connected with the bore $P_2$ which now acts as intake or suction side of the pump. A throttle bore 43′ which is provided in the control piston 41′ permits the pump to operate practically without pressure drop.

Figure 9:
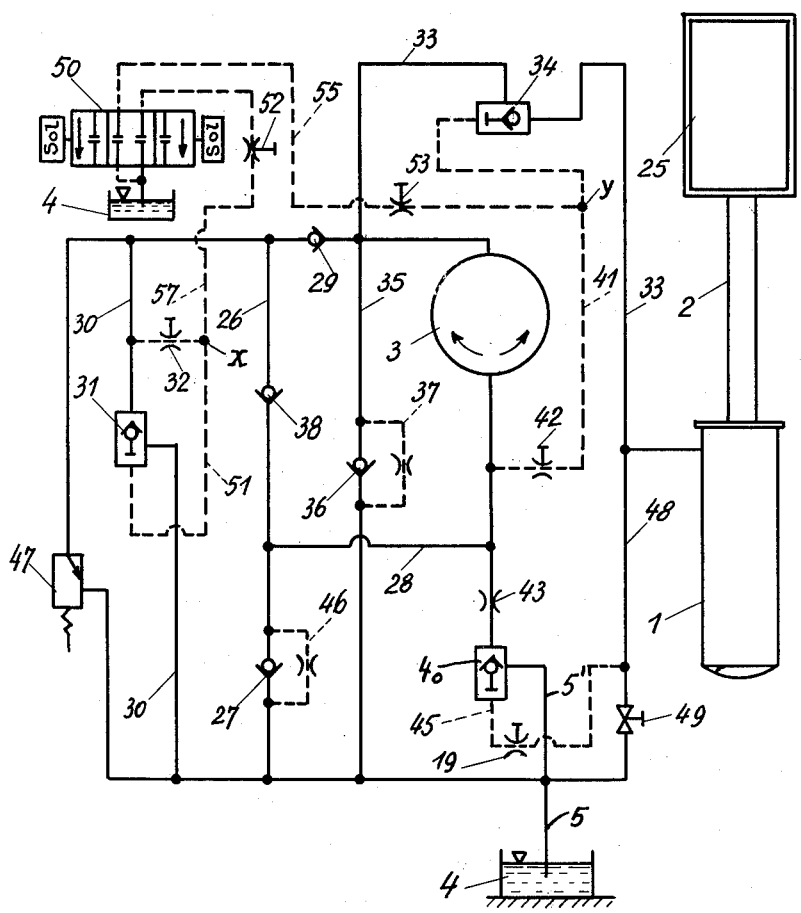
FIG. 9 is a diagrammatic view of a third embodiment of the hydraulic unit for use with lifts having an increased traveling speed.

This arrangement is suitable for low and medium lifting and descending speeds. In the case of high speeds, however, the cushioning effect attainable in starting and stopping the lift cage would no longer be sufficient and, in particular, the exact positioning of the cage by switching off the drive motor would become difficult due to an excessive mass of inertia. To tackle this problem, an additional regulating device may be incorporated in the control system as shown in FIG. 9, the control system remaining, in other respects, substantially unchanged. This device comprises a simple electromagnetically operated servo slide valve 50 which is connected in the system via two additional throttle valves 52 and 53. The servo slide valve 50 is controlled by means of limit switches of a type known per se and is connected, on the one hand, to the fluid reservoir 4 and, on the other hand, via a conduit 55 at Y with the control conduit 41 as well as, via a conduit 57, at X with the control conduit 51 of the starting valve 31.

Corresponding adjustment of the throttle valve 32 results, as already mentioned, in a smooth starting. When the throttle valve 32 is substantially closed, the acceleration will be very low whereas, when it is fully open, the cage 25 will start practically with the acceleration of the drive motor of the pump.

On the other hand, the amount of retardation in the stopping of the lifting cage can be set by means of the throttle valve 52. When the throttle valve 52 is closed, the lifting movement is not retarded but the lift cage will only stop with such amount of retardation as results from switching off the electric motor. In case this retardation should be excessively great, the throttle valve 52 is opened. Upon actuation of the slide valve 50 the starting valve 31, the control conduit 51 of which communicates with the throttle valve 52, will open at once thereby causing the lift cage to stop just as quickly. Accordingly, it is left to the operator's discretion to set any desired retardation by a corresponding setting of the throttle valve 52 and a corresponding leading of the limit switch.

The starting acceleration can be regulated by the throttle valve 42. When the throttle valve is open, the lift cage will start at the accelerating speed of the electric motor of the pump whereas, when it is fully closed, the cage will not start at all. When, in re-arresting the cage, the throttle valve 53 is closed, the limit switch which initiates the cushioning of the starting via the slide valve 50 remains inactive and the lift cage will stop with the retardation which results from switching off the electric motor. In the case of the throttle valve being fully open, the stopping action will have been completed already before the lift cage has moved into its exact stop position. Each intermediate positioning of the throttle valve 53 with a corresponding pre-setting of the limit switch will result in a predetermined cushioning of the stopping action which is finished by switching off the motor at the very moment the cage is in a correct position for stopping. In consequence thereof, it can be attained that at the moment the motor is being switched off the traveling speed of the cage will have decreased to a vast extent so as to allow the cage to be brought to a properly positioned stop.

This cushioning is substantially independent of the viscosity of the oil because it is controlled, as described above, by hydraulic throttle valves which practically have only the resistance to flow.

The system is usually set in such a manner that the retarding action is initiated at a distance of about ten to thirty centimeters before the termination of the plunger movement whereupon the drive motor is switched off by means of a second limit switch for bringing the cage to an exact stop. The cushioning is so adjusted that if the motor were not switched off, the lift cage would travel a distance of about five centimeters beyond its stopping point.

In practice, the control unit can be generally constructed in the same manner as the unit according to FIGS. 6, 7 and 8. The electromagnetically operated servo control device 50–57 can be connected in the system by means of the conduits 55 and 57, respectively, at X and Y as shown in FIG. 9.

Any desired modification may be made to the subject matter of the invention, particularly to the connections thereof, as herein described and illustrated, without departing from the spirit and scope of the present invention.

I claim:
1. A hydraulically operated unit for use with elevating platform lifts, said unit comprising a vertical single acting cylinder, a hollow plunger piston longitudinally movable within said cylinder, a lower head mounted on said piston, said hollow piston comprising a fluid reservoir for operating fluid, a fluid pump arranged between said cylinder and the reservoir in said piston, a motor for driving said pump, said motor being reversible so as to drive said pump in each of two opposite directions, said pump having a first port and a second port, one of said first and second ports serving as an inlet and the other as an outlet in a first direction of operation of said pump and the one port serving as an outlet and the other as an inlet in the second direction of operation of said pump, an inlet passage connecting each of said ports with the interior of said piston, a check valve in each of said inlet passages to permit the flow of fluid toward the pump only, each of said check valves having a restricted bleed passage therearound, an outlet passage connected to each of said ports, a controllable check valve in each of said outlet passages, one of said outlet passages communicating with the interior of said cylinder, the other of said outlet passages communicating with the interior of said piston, said controllable check valve in said other outlet passage being controlled to close during a lift operation by the pressure of said piston operating in a first control passage leading thereto from said one outlet passage downstream of said controllable check valve in said outlet passage, the controllable check valve in said one outlet passage being maintained open during the descent of said lift unit by pressure in a second control passage leading thereto from said other outlet passage containing a controllable check valve and upstream thereof, and safety pressure release means connected to each of said ports to release excessive fluid pressure.

2. The hydraulically operated unit defined in claim 1 wherein said controllable check valves are situated within said head.

3. The hydraulically operated unit defined in claim 1 wherein said motor is mounted on said pump and wherein said pump is mounted on said head, the controllable check valves being located in said head.

4. The hydraulically operated unit defined in claim 1 wherein said pump is a gear pump.

5. The hydraulically operated unit defined in claim 1 wherein said pump, said motor and said controllable check valves are arranged in a common housing exterior to said cylinder.

6. The hydraulically operated unit defined in claim 1 wherein said controllable check valves are arranged in opposition to each other, and further including a double-acting piston positioned between said controllable check valves to open said valves alternatively, said double-acting piston having two end faces which respond to fluid pressure from said pump.

7. The hydraulically operated unit defined in claim 1 further comprising an auxiliary inlet passage connecting the pump with said reservoir in said piston, said auxiliary inlet passage carrying fluid to said pump from said reservoir when the controllable check valve in the other of said outlet passages is closed, check valves in said auxiliary inlet passage to prevent the flow of fluid from said cylinder to said pump and then to said piston when said pump is not operative.

8. The hydraulically operated unit defined in claim 7 further comprising overflow passages arranged to by-pass said check valves, said overflow passages being so dimensioned that with said pump inoperative the pressure differential across said check valves and said pump gradually decreases to zero.

9. The hydraulically operated unit defined in claim 1 further comprising additional control passages for each of said controllable check valves in said one inlet passage, and a valve in said additional control passage to control the rate of descent of said piston.

10. The hydraulically operated unit defined in claim 1 further comprising another passage having a third check valve therein, a third control passage connected to said third check valve, throttle valve means in said third control passage for adjusting the rate of starting acceleration of said piston.

References Cited in the file of this patent

UNITED STATES PATENTS

| | | |
|---|---|---|
| 1,922,406 | Stukenborg | Aug. 15, 1933 |
| 2,280,291 | Jaseph | Apr. 21, 1942 |
| 2,359,112 | Humans | Sept. 26, 1944 |
| 2,467,508 | Trautman | Apr. 19, 1949 |
| 2,914,922 | Gibson | Dec. 1, 1959 |